US012136952B2

United States Patent
Kao et al.

(10) Patent No.: US 12,136,952 B2
(45) Date of Patent: Nov. 5, 2024

(54) CO-PACKAGED INTEGRATED OPTOELECTRONIC MODULE AND CO-PACKAGED OPTOELECTRONIC SWITCH CHIP

(71) Applicant: Dongguan Luxshare Technologies Co., Ltd, Dongguan (CN)

(72) Inventors: Min-Sheng Kao, Taipei (TW); ChunFu Wu, Dongguan (CN); Chung-Hsin Fu, Taipei (TW); QianBing Yan, Dongguan (CN); LinChun Li, Dongguan (CN); Chih-Wei Yu, Taipei (TW); Chien-Tzu Wu, Taipei (TW); Yi-Tseng Lin, Taipei (TW)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 164 days.

(21) Appl. No.: 17/884,845

(22) Filed: Aug. 10, 2022

(65) Prior Publication Data
US 2023/0122313 A1      Apr. 20, 2023

(30) Foreign Application Priority Data
Oct. 20, 2021   (CN) .......................... 202111218807.9

(51) Int. Cl.
*H04B 10/40*   (2013.01)
*G02B 6/42*    (2006.01)

(52) U.S. Cl.
CPC ........... *H04B 10/40* (2013.01); *G02B 6/4246* (2013.01)

(58) Field of Classification Search
CPC ............................. H04B 10/40; G02B 6/4246
(Continued)

(56) References Cited

U.S. PATENT DOCUMENTS

| 7,373,033 B2 * | 5/2008 | Lu ........................ G02B 6/4246 |
| | | 257/432 |
| 2005/0035732 A1 * | 2/2005 | Horng .................... H02P 29/02 |
| | | 318/434 |

(Continued)

FOREIGN PATENT DOCUMENTS

| CN | 202043111 U | 11/2011 |
| CN | 104280833 A | 1/2015 |

(Continued)

OTHER PUBLICATIONS

Tian et al; Experimental demonstration of a reconfigurable electro-optic directed logic circuit using cascaded carrier-injection micro-ring resonators ; Jul. 2018; Nature.com; pp. 1-10. (Year: 2018).*

*Primary Examiner* — Amritbir K Sandhu
(74) *Attorney, Agent, or Firm* — Birch, Stewart, Kolasch & Birch, LLP

(57) ABSTRACT

Disclosed are a co-packaged integrated optoelectronic module and a co-packaged optoelectronic switch chip. The co-packaged integrated optoelectronic module includes a carrier board, and an optoelectronic submodule, a slave microprocessor and a master microprocessor disposed on and electrically connected to the carrier board. In the optoelectronic submodule, a digital signal processing chip converts an electrical analog signal into an electrical digital signal, an optoelectronic signal analog conversion chip converts an optical analog signal into the electrical analog signal to the digital signal processing chip, and an optical transceiver chip receives and transmits the optical analog signal to the optoelectronic signal analog conversion chip. The slave microprocessor monitors operation of the optoelectronic submodule. The master microprocessor processes a low-speed digital signal transmitted from the co-packaged integrated optoelectronic module to the outside, monitors operation of the co-packaged integrated optoelectronic mod- (Continued)

ule, and performs initialization of the co-packaged integrated optoelectronic module.

18 Claims, 12 Drawing Sheets

(58) Field of Classification Search
USPC .......................................................... 398/115
See application file for complete search history.

(56) References Cited

U.S. PATENT DOCUMENTS

| | | | |
|---|---|---|---|
| 2005/0135732 A1 | 6/2005 | Crow et al. | |
| 2013/0230272 A1* | 9/2013 | Raj ..................... | G02B 6/4246 |
| | | | 385/14 |
| 2018/0292607 A1* | 10/2018 | Dong ................. | G02B 6/12002 |
| 2019/0243164 A1 | 8/2019 | Nelson et al. | |
| 2020/0183103 A1* | 6/2020 | Hochberg ............ | G02B 6/4232 |
| 2021/0333494 A1* | 10/2021 | dos Santos Fegadolli .................. | |
| | | | G02B 6/4269 |
| 2021/0385000 A1* | 12/2021 | Nagarajan ............ | G02B 6/4246 |
| 2022/0037855 A1* | 2/2022 | Bovington .............. | H01S 5/042 |
| 2023/0122313 A1* | 4/2023 | Kao ..................... | G02B 6/4257 |
| | | | 398/115 |

FOREIGN PATENT DOCUMENTS

| | | | | |
|---|---|---|---|---|
| CN | 104395801 A | 3/2015 | | |
| CN | 105162731 A | 12/2015 | | |
| CN | 111665801 A | 9/2020 | | |
| CN | 111902755 A | 11/2020 | | |
| CN | 113169234 A | 7/2021 | | |
| EP | 3121630 A1 * | 1/2017 | ........... | G02B 6/4246 |
| TW | 200518488 A | 6/2005 | | |
| TW | 201339883 A | 10/2013 | | |
| TW | 202033152 A | 9/2020 | | |
| WO | WO-2021171438 A1 * | 9/2021 | ......... | H04Q 11/0005 |

\* cited by examiner

CO-PACKAGED INTEGRATED OPTOELECTRONIC MODULE AND CO-PACKAGED OPTOELECTRONIC SWITCH CHIP

CROSS REFERENCE TO RELATED APPLICATION

This application claims the priority benefit of Chinese Patent Application Serial Number 202111218807.9, filed on Oct. 20, 2021, the full disclosure of which is incorporated herein by reference.

BACKGROUND

Technical Field

The present disclosure relates to the technical field of communication technology, and in particular to a co-packaged integrated optoelectronic module and a co-packaged optoelectronic switch chip.

Related Art

In a modern communication system, the demand for network traffic is increasing very rapidly. Therefore, the demand for the data transmission density of a switch is greatly increased.

With the increase in data transmission density, the number of optoelectronic modules of the switch increases, resulting in an increase in the volume of the switch. However, there is the development trend of the gradual miniaturization of existing electronic products and/or accommodating more functional components in a limited space. Thus, how to provide a miniaturized optoelectronic module to make the data transmission density of a switch using the miniaturized optoelectronic module in a limited space increase in response to the development trend of the market becomes a problem that need to be solved urgently by those skilled in the art.

SUMMARY

The present disclosure provides a co-packaged integrated optoelectronic module and a co-packaged optoelectronic switch chip, which can solve the problem that the size of the switch does not meet the needs of market development since the switch needs to increase the number of optoelectronic modules to increase the data transmission density.

In order to solve the above technical problem, the present disclosure is implemented as follows.

According to a first aspect, the present disclosure provides a co-packaged integrated optoelectronic module, which includes an optoelectronic submodule, a slave microprocessor, a master microprocessor and a carrier board. The optoelectronic submodule, the slave microprocessor and the master microprocessor are disposed on and electrically connected to the carrier board. The optoelectronic submodule includes a digital signal processing chip, an optoelectronic signal analog conversion chip, and an optical transceiver chip. The optoelectronic signal analog conversion chip is connected to the digital signal processing chip, and the optical transceiver chip is connected to the optoelectronic signal analog conversion chip. The digital signal processing chip is configured to convert an electrical analog signal, which is received, into an electrical digital signal, and process the electrical digital signal to output a high-speed digital signal. The optoelectronic signal analog conversion chip is configured to convert an optical analog signal into the electrical analog signal to the digital signal processing chip. The optical transceiver chip is configured to receive and transmit the optical analog signal to the optoelectronic signal analog conversion chip, and transmit another optical analog signal. The slave microprocessor is connected to the optoelectronic submodule and is configured to monitor operation of the optoelectronic submodule. The master microprocessor is connected to the optoelectronic submodule and is configured to process a low-speed digital signal transmitted from the co-packaged integrated optoelectronic module to the outside, monitor operation of the co-packaged integrated optoelectronic module, and perform initialization of the co-packaged integrated optoelectronic module.

According to a second aspect, the present disclosure provides a co-packaged optoelectronic switch chip, which includes a switch application specific integrated circuit (ASIC), an even number of co-packaged integrated optoelectronic modules of the present disclosure, and a substrate. The even number of the co-packaged integrated optoelectronic modules and the switch ASIC are disposed on and electrically connected to the substrate, and the even number of the co-packaged integrated optoelectronic modules are respectively electrically connected to the switch ASIC and surround the switch ASIC.

In the embodiment of the present disclosure, the co-packaged integrated optoelectronic module integrates and encapsulates the optoelectronic submodule, the slave microprocessor, and the master microprocessor, so as to realize the miniaturization of the co-packaged integrated optoelectronic module. When the miniaturized co-packaged integrated optoelectronic module is applied to the co-packaged optoelectronic switch chip (i.e., the switch), the co-packaged optoelectronic switch chip can accommodate more co-packaged integrated optoelectronic modules in a limited space, and the data transmission density of the co-packaged optoelectronic switch chip can be improved to meets the development needs of the market. In addition, through the settings of the slave microprocessor and the master microprocessor, the overall operation of the co-packaged integrated optoelectronic module can be effectively monitored and controlled.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
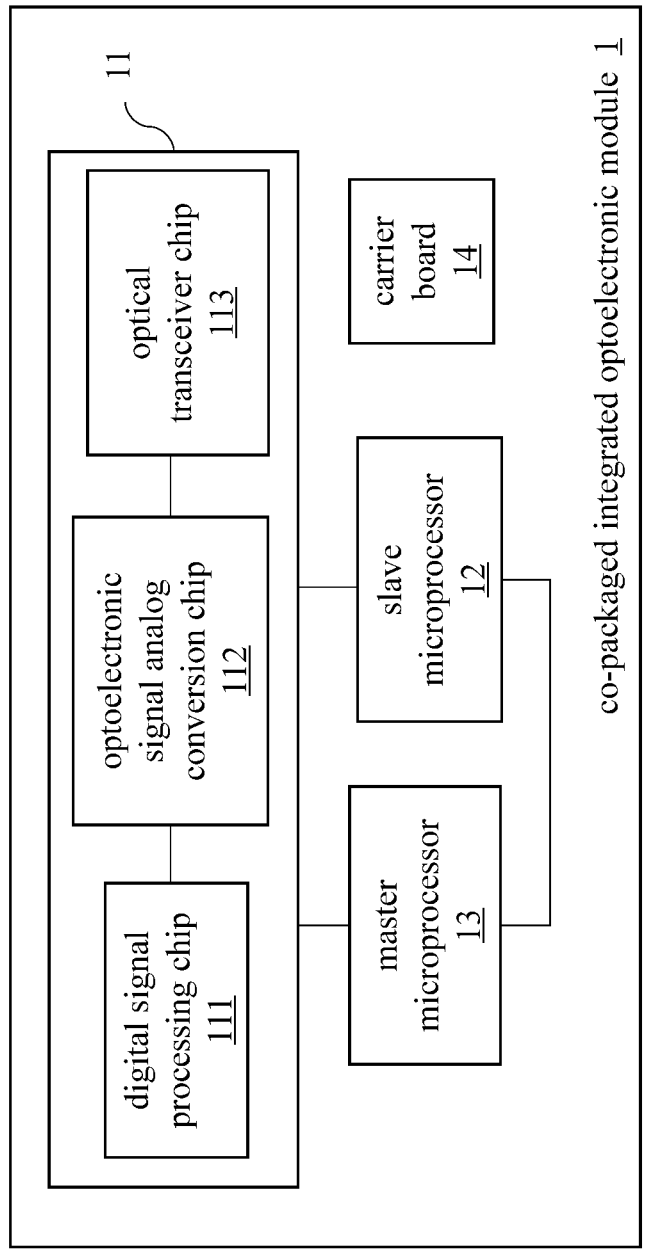
FIG. 1 is a block diagram of a co-packaged integrated optoelectronic module according to a first embodiment of the present disclosure.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to".

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

It must be understood that when a component is described as being "connected" or "coupled" to (or with) another component, it may be directly connected or coupled to other components or through an intermediate component. In contrast, when a component is described as being "directly connected" or "directly coupled" to (or with) another component, there are no intermediate components. In addition, unless specifically stated in the specification, any term in the singular case also comprises the meaning of the plural case.

In the following embodiment, the same reference numerals are used to refer to the same or similar elements throughout the disclosure.

Figure 2:
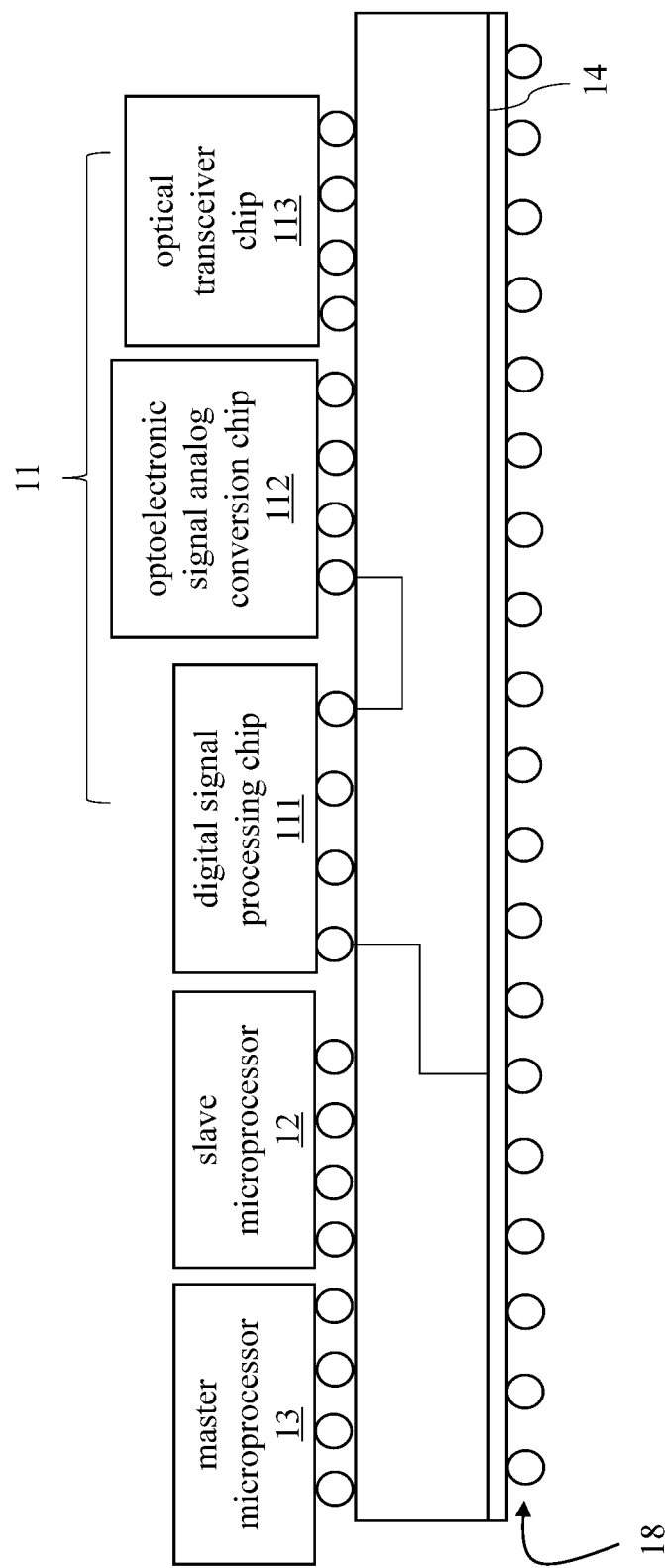
FIG. 2 is a schematic cross-sectional view of an embodiment of the optoelectronic submodule, the slave microprocessor, and the master microprocessor of FIG. 1 disposed on a carrier board.

Please refer to FIGS. 1 and 2, wherein FIG. 1 is a block diagram of a co-packaged integrated optoelectronic module according to a first embodiment of the present disclosure, and FIG. 2 is a schematic cross-sectional view of an embodiment of the optoelectronic submodule, the slave microprocessor, and the master microprocessor of FIG. 1 disposed on a carrier board. As shown in FIGS. 1 and 2, the co-packaged integrated optoelectronic module 1 comprises an optoelectronic submodule 11, a slave microprocessor 12, a master microprocessor 13 and a carrier board 14. The optoelectronic submodule 11, the slave microprocessor 12, and the master microprocessor 13 are disposed on and electrically connected to the carrier board 14, which can be, but is not limited to, a printed circuit board. Specifically, the electrical connection lines among the optoelectronic submodule 11, the slave microprocessor 12 and the master microprocessor 13 can be disposed on the surface or inside of the carrier board 14. The optoelectronic submodule 11, the slave microprocessor 12, and the master microprocessor 13 and the carrier board 14 are integrated and packaged together to form the co-packaged integrated optoelectronic module 1.

In this embodiment, the optoelectronic submodule 11 includes a digital signal processing chip 111, an optoelectronic signal analog conversion chip 112, and an optical transceiver chip 113. The optoelectronic signal analog conversion chip 112 is connected to the digital signal processing chip 111, and the optical transceiver chip 113 is connected to optoelectronic signal analog conversion chip 112. The digital signal processing chip 111 is configured to convert an electrical analog signal, which is received, into an electrical digital signal, and process the electrical digital signal to output a high-speed digital signal. The optoelectronic signal analog conversion chip 112 is configured to convert an optical analog signal into the electrical analog signal to the digital signal processing chip 111. The optical transceiver chip 113 is configured to receive and transmit the optical analog signal to the optoelectronic signal analog conversion chip 112, and transmit another optical analog signal. The digital signal processing chip 111 may include but is not limited to a clock and data recovery circuit (CDR) and a digital signal processor (DSP), and the optical transceiver chip 113 may be, but not limited to, a photonic integrated circuit (PIC). Specifically, the digital signal processing chip 111, the optoelectronic signal analog conversion chip 112, and the optical transceiver chip 113 are integrated together to form the optoelectronic submodule 11.

It should be noted that the optical transceiver chip 113 is a multi-channel optical transceiver chip, and each channel can have the same transmission rate or the different transmission rates. The number of channels of the optical transceiver chip 113 and the transmission rate of each channel can be adjusted based on the actual transmission rate of the co-packaged integrated optoelectronic module 1. For example, the transmission rate of the co-packaged integrated optoelectronic module 1 may be 800 Gbps, the number of channels of the optical transceiver chip 113 may be eight, and the transmission rate of each channel may be 100 Gbps. In addition, the optical transceiver chip 113 can communicates with the outside using the optical analog signals through multiple optical fibers and optical connectors, wherein one optical fiber corresponds to one channel.

In this embodiment, the slave microprocessor 12 is connected to the optoelectronic submodule 11 and is configured to monitor the operation of the optoelectronic submodule 11. The master microprocessor 13 is connected to the optoelectronic submodule 11 and is configured to process a low-speed digital signal transmitted from the co-packaged integrated optoelectronic module 1 to the outside, monitor operation of the co-packaged integrated optoelectronic module 1, and perform initialization of the co-packaged integrated optoelectronic module 1. Specifically, the slave microprocessor 12 can be used to monitor and control the operation of the internal components of the co-packaged integrated optoelectronic module 1, and the master microprocessor 13 can be used to monitor and control the overall operation of the co-packaged integrated optoelectronic module 1, and control the signals of the co-packaged integrated optoelectronic module 1 which is output to the outside. The slave microprocessor 12 can perform the digital control of general-purpose input and output of the optoelectronic submodule 11, and the master microprocessor 13 can perform digital monitoring on the overall operation of the co-packaged integrated optoelectronic module 1. Specifically, through the setting of the slave microprocessor 12 and the master microprocessor 13, the overall operation of the co-packaged integrated optoelectronic module 1 can be effectively monitored and controlled.

It should be noted that, in order to avoid the complexity of the drawings in FIGS. 1 and 2, the connection lines between the slave microprocessor 12 and the components in the optoelectronic submodule 11 and the connection lines between the master microprocessor 13 and the components and the modules in the co-packaged integrated optoelectronic module 1 can be omitted from drawing. In addition, the slave microprocessor 12 may include, for example, a general purpose microprocessor, an instruction set processor and/or a related chipset, and/or a special purpose microprocessor (e.g., an ASIC). When the slave microprocessor 12 is an ASIC, the performance of the slave microprocessor 12 is more optimized and the processing speed is faster since the ASIC is designed for the co-packaged integrated optoelectronic module 1.

Figure 3:
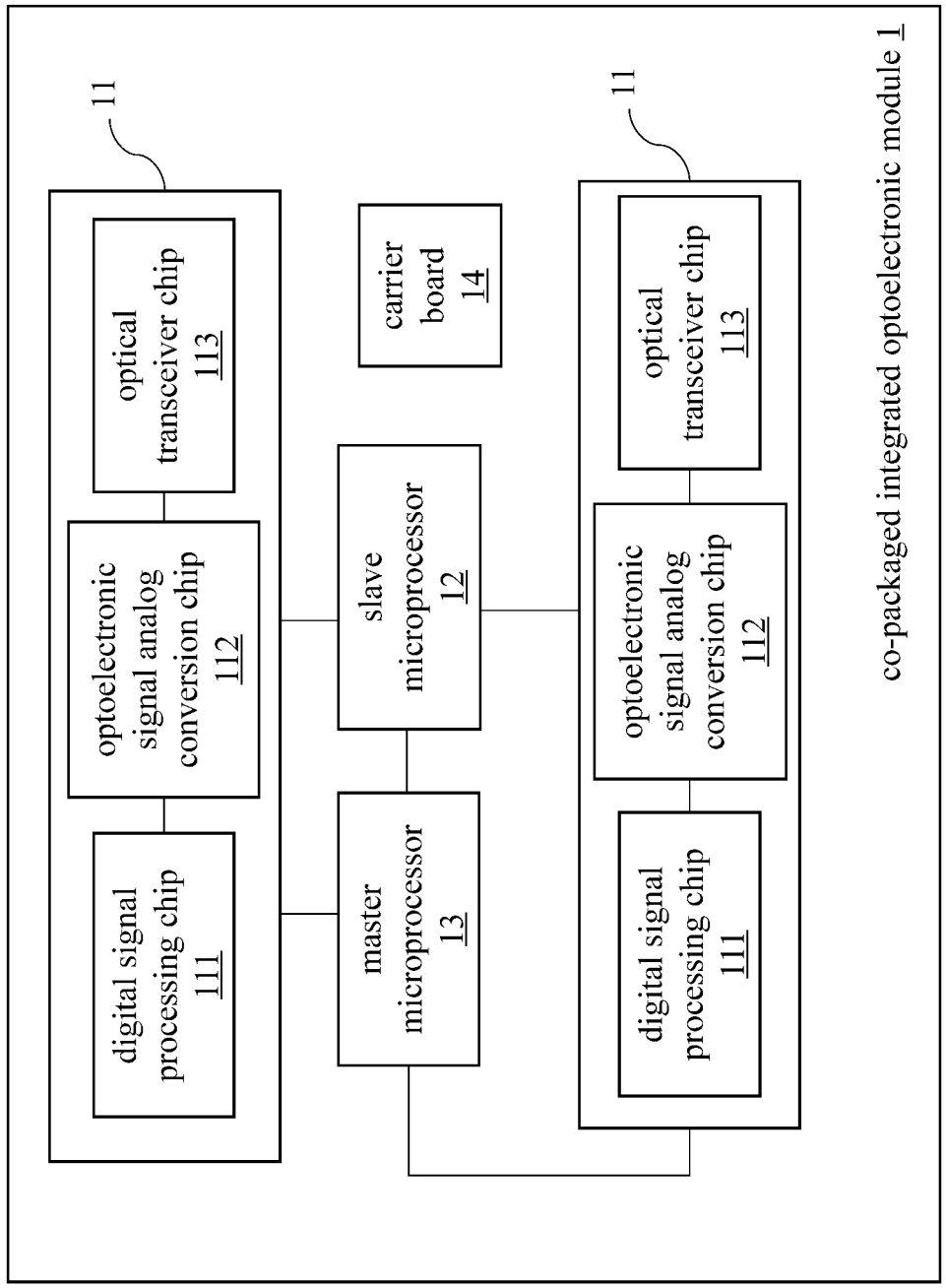
FIG. 3 is a block diagram of a co-packaged integrated optoelectronic module according to a second embodiment of the present disclosure.

In an embodiment, the number of optoelectronic submodules 11 may be one (as shown in FIG. 1) or an even number (as shown in FIG. 3, which is a block diagram of a co-packaged integrated optoelectronic module according to a second embodiment of the present disclosure). The number of optoelectronic submodules 11 can be adjusted according to the transmission rate of the actual co-packaged integrated optoelectronic module 1, the number of channels of the optical transceiver chip 113 and the transmission rate of each channel. For example, the transmission rate of the co-packaged integrated optoelectronic module 1 in FIG. 2 can be 800 Gbps, the number of optoelectronic submodules 11 of the co-packaged integrated optoelectronic module 1 can be two, the number of channels of the optical transceiver chip 113 of the optoelectronic submodule 11 can be four, and the transmission rate of each channel can be 100 Gbps. In another example, the transmission rate of the co-packaged integrated optoelectronic module 1 can be 1.6 Tbps, the number of optoelectronic submodules 11 of the co-packaged integrated optoelectronic module 1 can be four, the number of channels of the optical transceiver chip 113 of the optoelectronic submodule 11 can be four, and the transmission rate of each channel can be 100 Gbps. In another example, the transmission rate of the co-packaged integrated optoelectronic module 1 can be 1.6 Tbps, the number of optoelectronic submodules 11 of the co-packaged integrated optoelectronic module 1 can be two, and the number of channels of the optical transceiver chip 113 of the optoelectronic submodule 11 can be eight, and the transmission rate of each channel can be 100 Gbps.

In an example, when the number of optoelectronic submodules 11 of the co-packaged integrated optoelectronic module 1 can be an even number, the number of slave microprocessors 12 of the co-packaged integrated optoelectronic module 1 can be one, and the slave microprocessor 12 monitors the even number of optoelectronic submodules 11 (that is, there is a many-to-one correspondence between the optoelectronic submodules 11 and the slave microprocessor 12) (as shown in FIG. 3). In another example, the number of optoelectronic submodules 11 of the co-packaged integrated optoelectronic module 1 is the same as the number of slave microprocessors 12 of the co-packaged integrated optoelectronic module 1, and one slave microprocessor 12 monitors one optoelectronic submodule 11 (that is, there is a one-to-one correspondence between the optoelectronic submodules 11 and the slave microprocessors 12).

It should be noted that, in the above-mentioned embodiments of FIGS. 1 to 3, the another optical analog signal sent by the optical transceiver chip 113 may come from an external light source unit. Therefore, the co-packaged integrated optoelectronic module 1 of FIGS. 1 to 3 does not include a light source unit.

Figure 4:
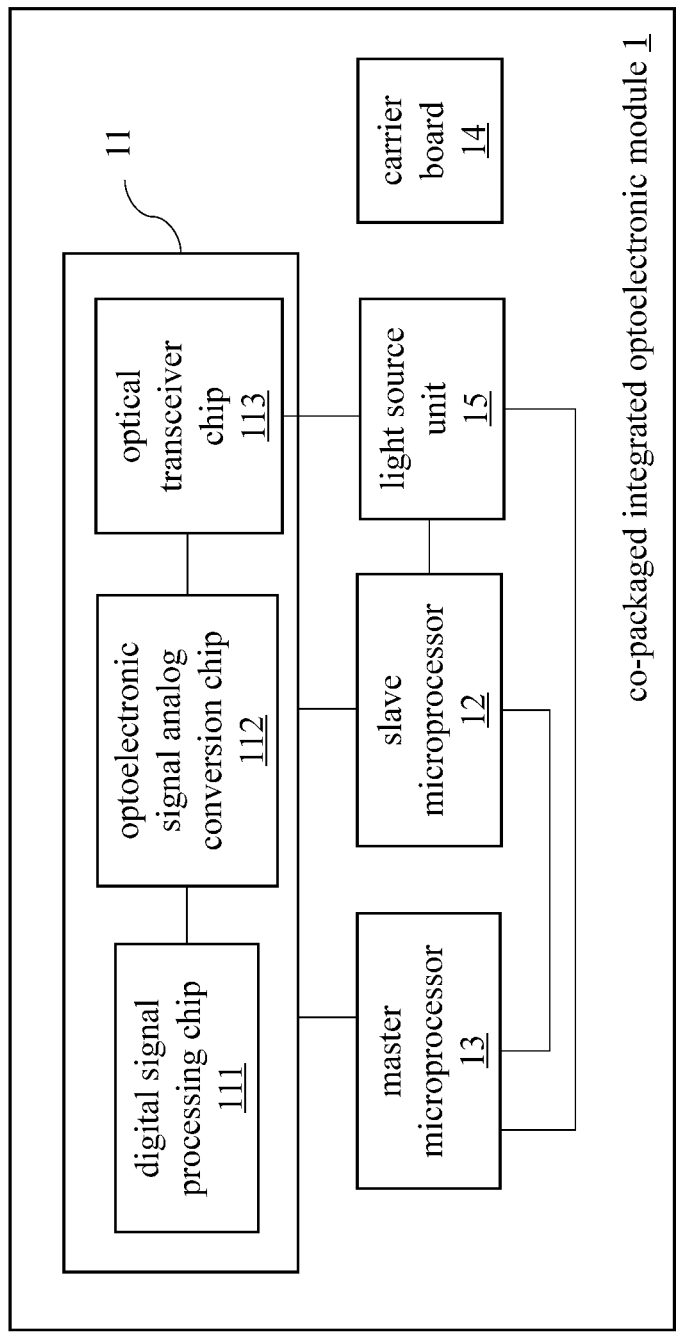
FIG. 4 is a block diagram of a co-packaged integrated optoelectronic module according to a third embodiment of the present disclosure.

In one embodiment, please refer to FIG. 4, which is a block diagram of a co-packaged integrated optoelectronic module according to a third embodiment of the present disclosure. As shown in FIG. 4, the co-packaged integrated optoelectronic module 1 may further comprise a light source unit 15 connected to the optical transceiver chip 113 and the slave microprocessor 12. The light source unit 15 may be configured to output the another optical analog signal to the optical transceiver chip 113 for transmission based on a control signal from the slave microprocessor 12. In other words, the light source unit 15 can be integrated and packaged with the optoelectronic submodule 11, the slave microprocessor 12, the master microprocessor 13, and the carrier board 14, and the slave microprocessor 12 can control the light source unit 15 to transmit the another optical analog signal to the optical transceiver chip 113.

Figure 5:
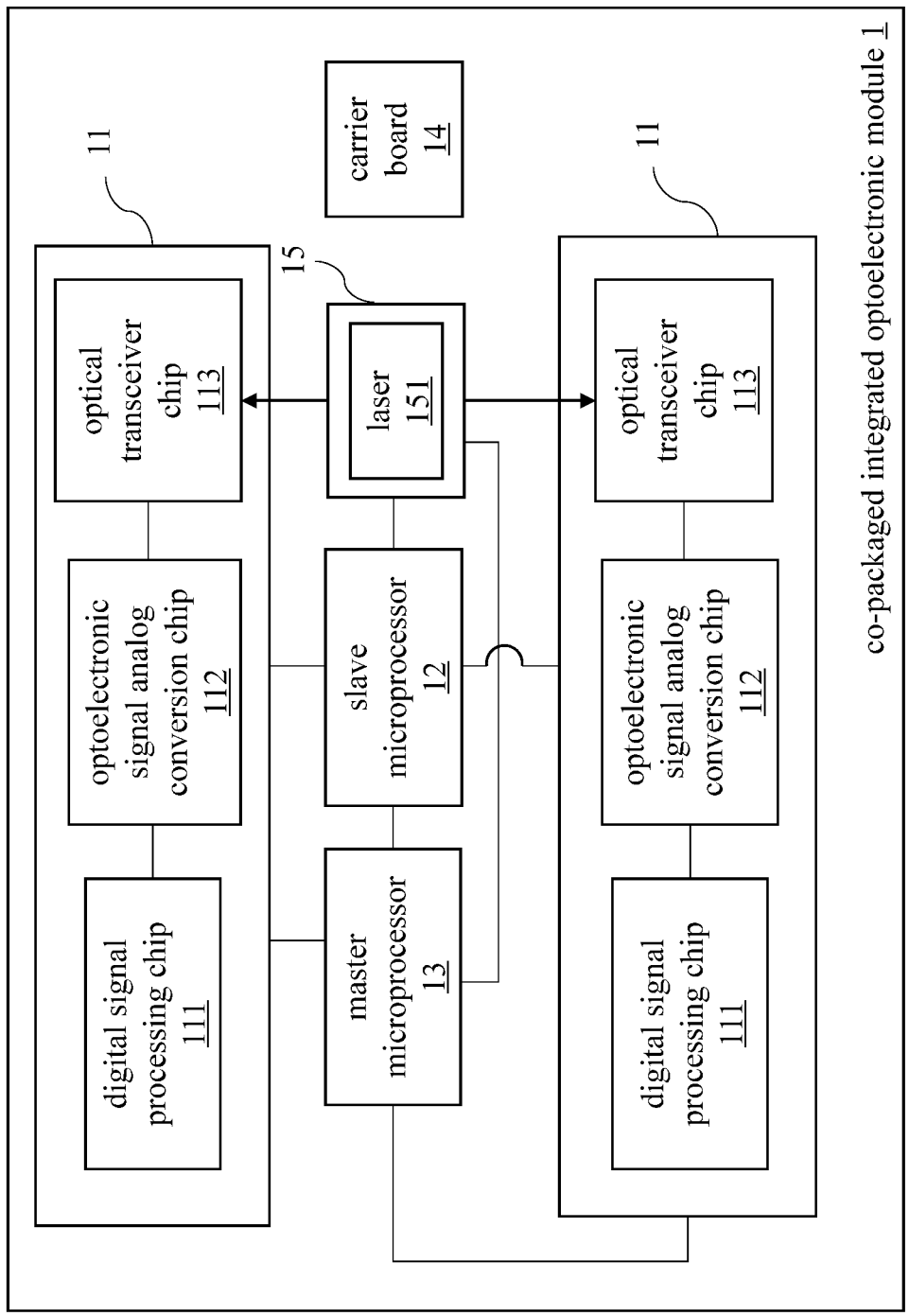
FIG. 5 is a block diagram of a co-packaged integrated optoelectronic module according to a fourth embodiment of the present disclosure.
Figure 6:
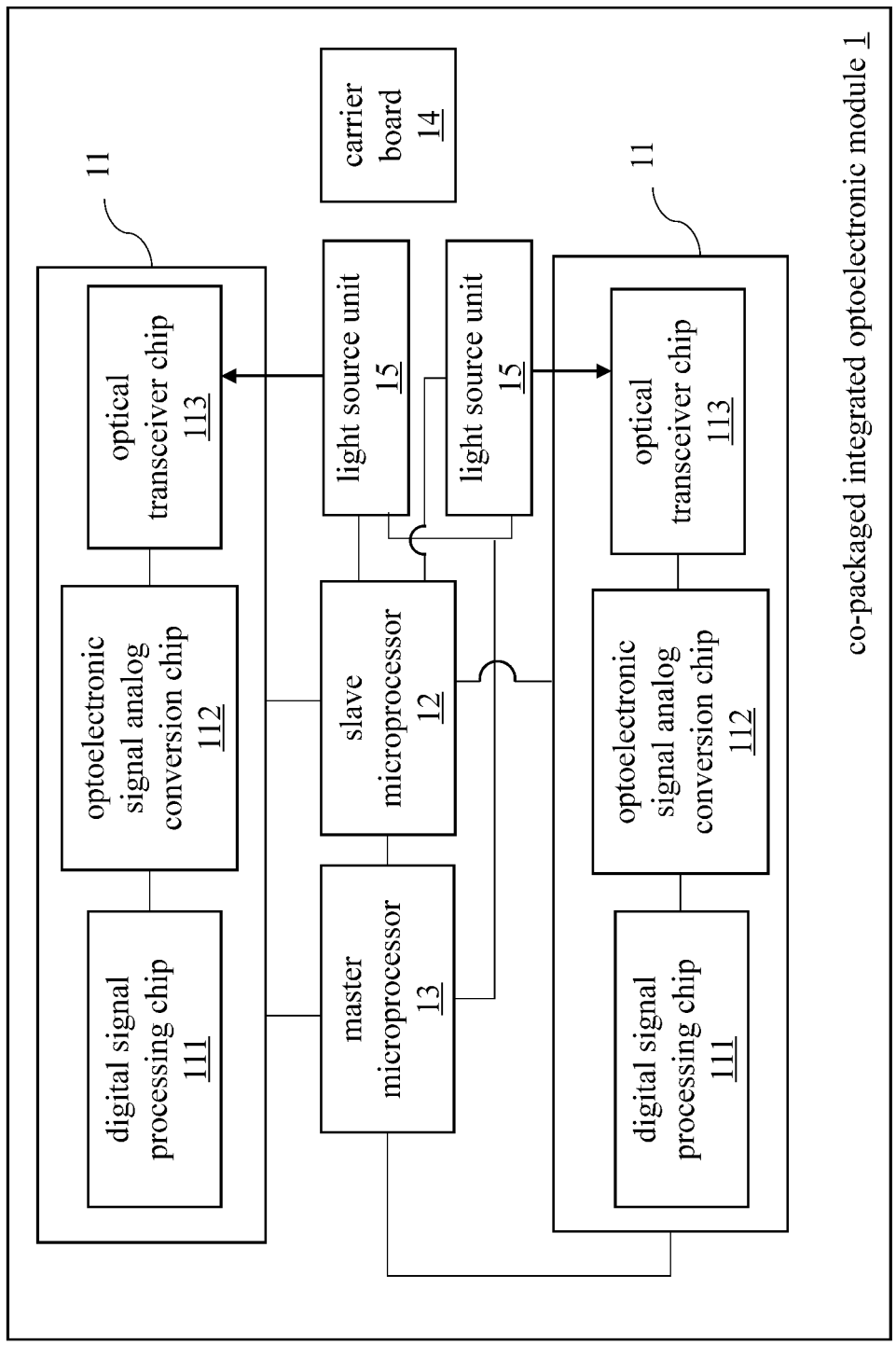
FIG. 6 is a block diagram of a co-packaged integrated optoelectronic module according to a fifth embodiment of the present disclosure.

In an example, when the number of optoelectronic modules 11 of the co-packaged integrated optoelectronic module 1 can be an even number, the number of light source units 15 can be one, and the light source unit 15 outputs the another optical analog signal to the optical transceiver chip 113 of each optoelectronic module 11 (that is, there is a many-to-one correspondence between the optoelectronic modules 11 and the light source unit 15) (as shown in FIG. 5, which is a block diagram of a co-packaged integrated optoelectronic module according to a fourth embodiment of the present disclosure). In another example, the number of optoelectronic modules 11 of the co-packaged integrated optoelectronic module 1 is the same as the number of light source units 15 of the co-packaged integrated optoelectronic module 1, and one light source unit 15 outputs the another optical analog signal to one optoelectronic submodule 11 (that is, there is a one-to-one correspondence between optoelectronic modules 11 and light source units 15) (as shown in FIG. 6, which is a block diagram of a co-packaged integrated optoelectronic module according to a fifth embodiment of the present disclosure).

In one embodiment, since the optical transceiver chip 113 is a multi-channel optical transceiver chip, the light source unit 15 may include one or an even number of lasers 151, and the light source unit 15 may be configured to output the another optical analog signal having a single wavelength through the one or the even number of lasers 151. Specifically, the one or the even number of lasers 151 included in the light source unit 15 can output optical analog signals of the same wavelength, and the optical analog signal output by the one laser 151 can be transmitted through one or more channels of the optical transceiver chip 113 (i.e., one laser 151 corresponds to one or more channels of the optical transceiver chip 113). The number of lasers 151 included in the light source unit 15 may be but not limited to one (as shown in FIG. 5), and the number of lasers 151 included in the actual light source unit 15 may be adjusted according to actual requirements.

Figure 7:
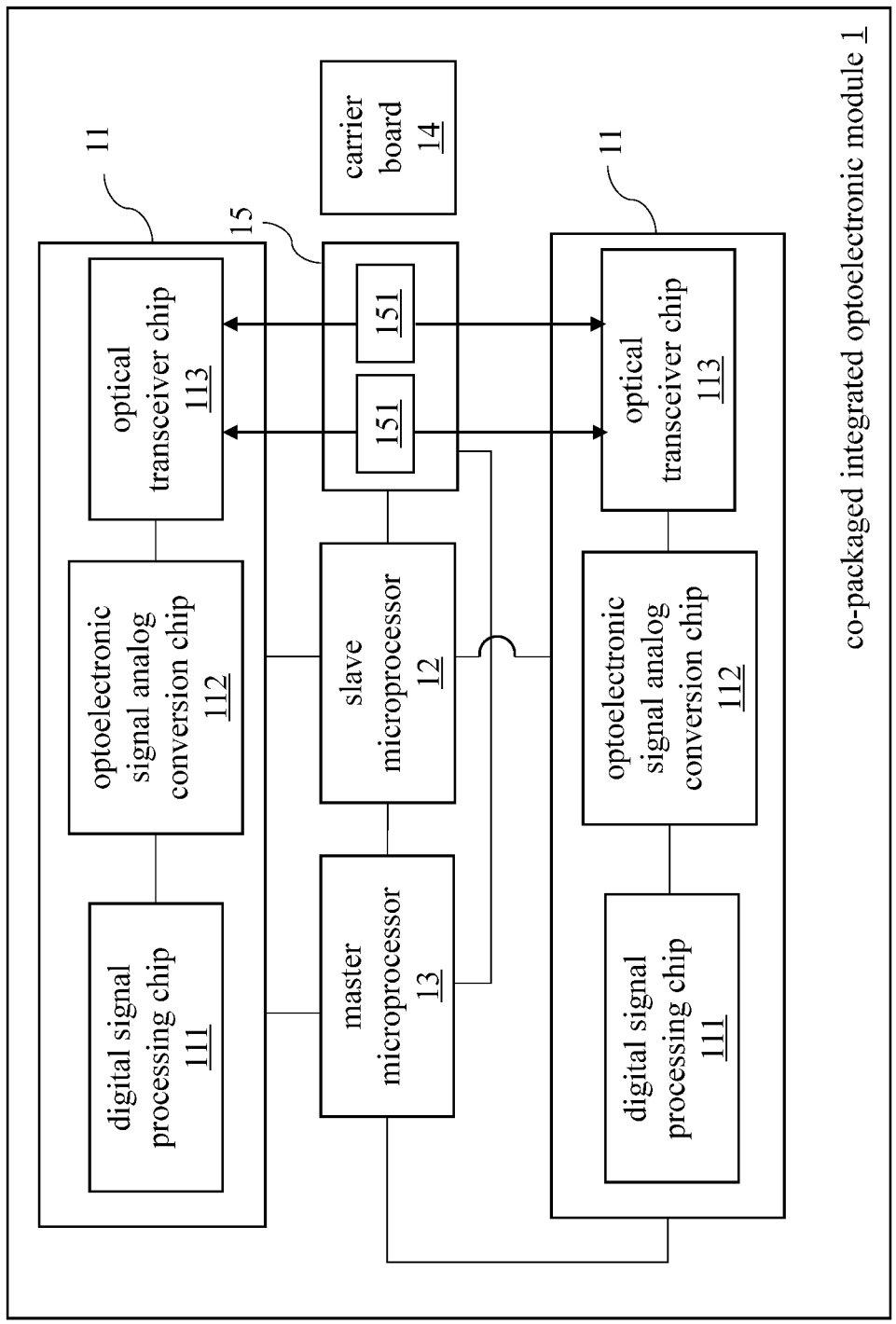
FIG. 7 is a block diagram of a co-packaged integrated optoelectronic module according to a sixth embodiment of the present disclosure.

In another embodiment, since the optical transceiver chip 113 is a multi-channel optical transceiver chip, the light source unit 15 may comprise an even number of lasers 151, and the light source unit 15 may be configured to output the another optical analog signal having different wavelengths through the even number of lasers 151. Specifically, the even number of lasers 151 included in the light source unit 15 can respectively output optical analog signals of different wavelengths, and the optical analog signal output by one laser 151 can be transmitted through one or more channels of the optical transceiver chip 113 (that is, one laser 151 corresponds to one or more channels of the optical transceiver chip 113). The number of lasers 151 included in the light source unit 15 may be but not limited to two (as shown in FIG. 7, which is a block diagram of a co-packaged integrated optoelectronic module according to a sixth embodiment of the present disclosure). The number of lasers 151 included in the actual light source unit 15 can be adjusted according to actual requirements. For example, the optical transceiver chip 113 is a four-channel optical transceiver chip, the number of lasers 151 included in the light source unit 15 can be four, and one channel of the optical transceiver chip 113 corresponds to one laser 151.

In an embodiment, the slave microprocessor 12 may be further configured to output a control current matching the control signal to the light source unit 15 in a current-type digital-to-analog conversion manner, or output a control voltage matching the control signal to the light source unit 15 in a voltage-type digital-to-analog conversion manner. Specifically, the slave microprocessor 12 may comprise a current-type digital-to-analog conversion unit 121 and/or a voltage-type digital-to-analog conversion unit 122, and the slave microprocessor 12 may output the control current through the current-type digital-to-analog conversion unit 121 or output the control voltage through the voltage-type digital-to-analog conversion unit 122, to control the light source unit 15 to output the optical analog signal (as shown in FIG. 8, which is a block diagram of a co-packaged integrated optoelectronic module according to a seventh embodiment of the present disclosure).

In an embodiment, the slave microprocessor 12 may be further configured to perform closed loop control of the optoelectronic submodule 11 and the light source unit 15 according to digital monitoring data of the optoelectronic submodule 11 and the light source unit 15. Specifically, since the slave microprocessor 12 can monitor the operation of the optoelectronic submodule 11 and the light source unit 15, the slave microprocessor 12 can perform feedback control of the operation of the optoelectronic submodule 11 and the light source unit 15 according to the monitoring result of the optoelectronic submodule 11 and the light source unit 15 (i.e., the digital monitoring data). In an example, the slave microprocessor 12 may perform feedback control of the optoelectronic submodule 11 and the light source unit 15 according to the temperature of the optoelectronic submodule 11 and the optical power of the light source unit 15, to maintain the operational stability of the optoelectronic submodule 11 and the light source unit 15.

Figure 8:
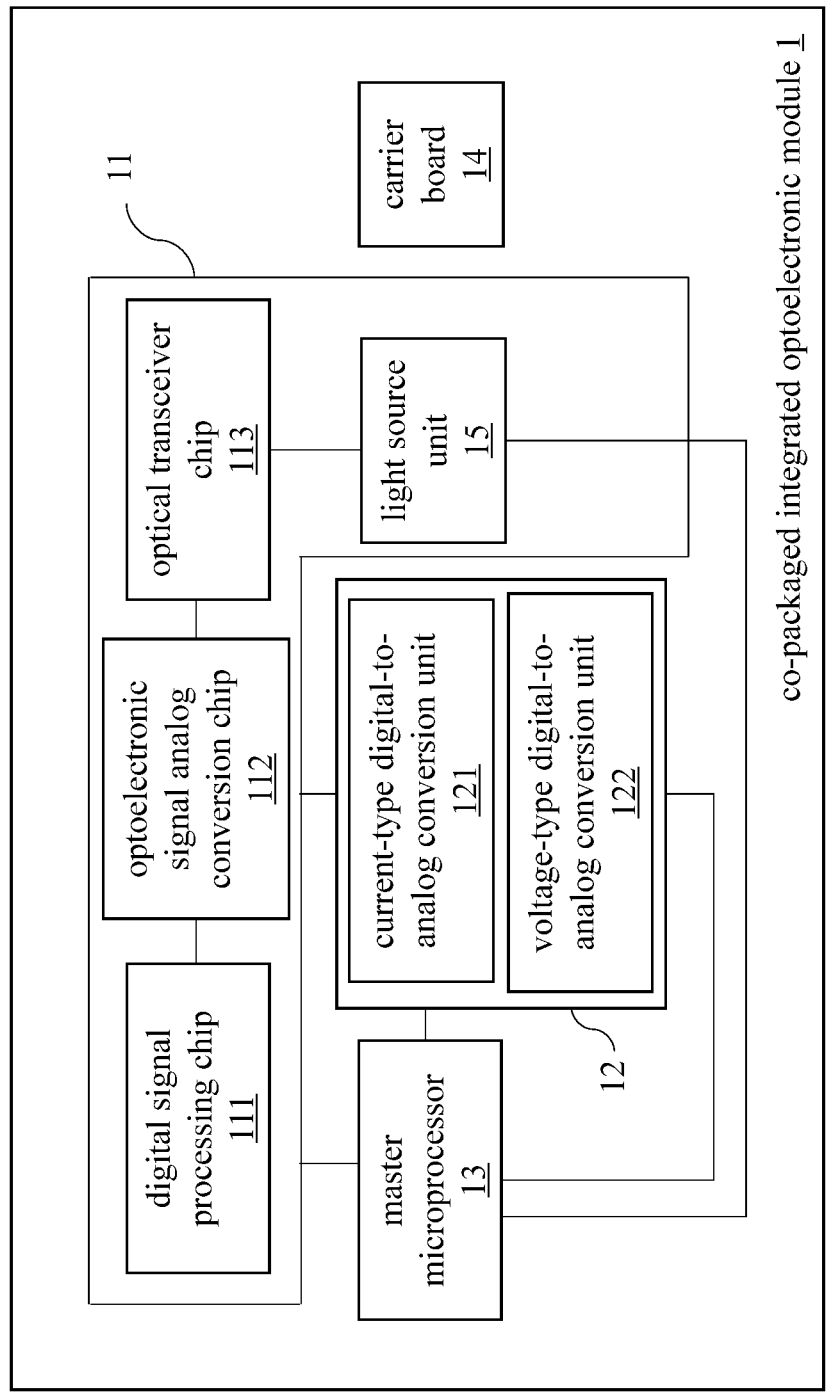
FIG. 8 is a block diagram of a co-packaged integrated optoelectronic module according to a seventh embodiment of the present disclosure.

In an embodiment, the light source unit 15 may be integrated into the optoelectronic submodule 11 (as shown in FIG. 8). When the number of optoelectronic modules 11 is an even number, the number of light source units 15 is also an even number.

Figure 9:
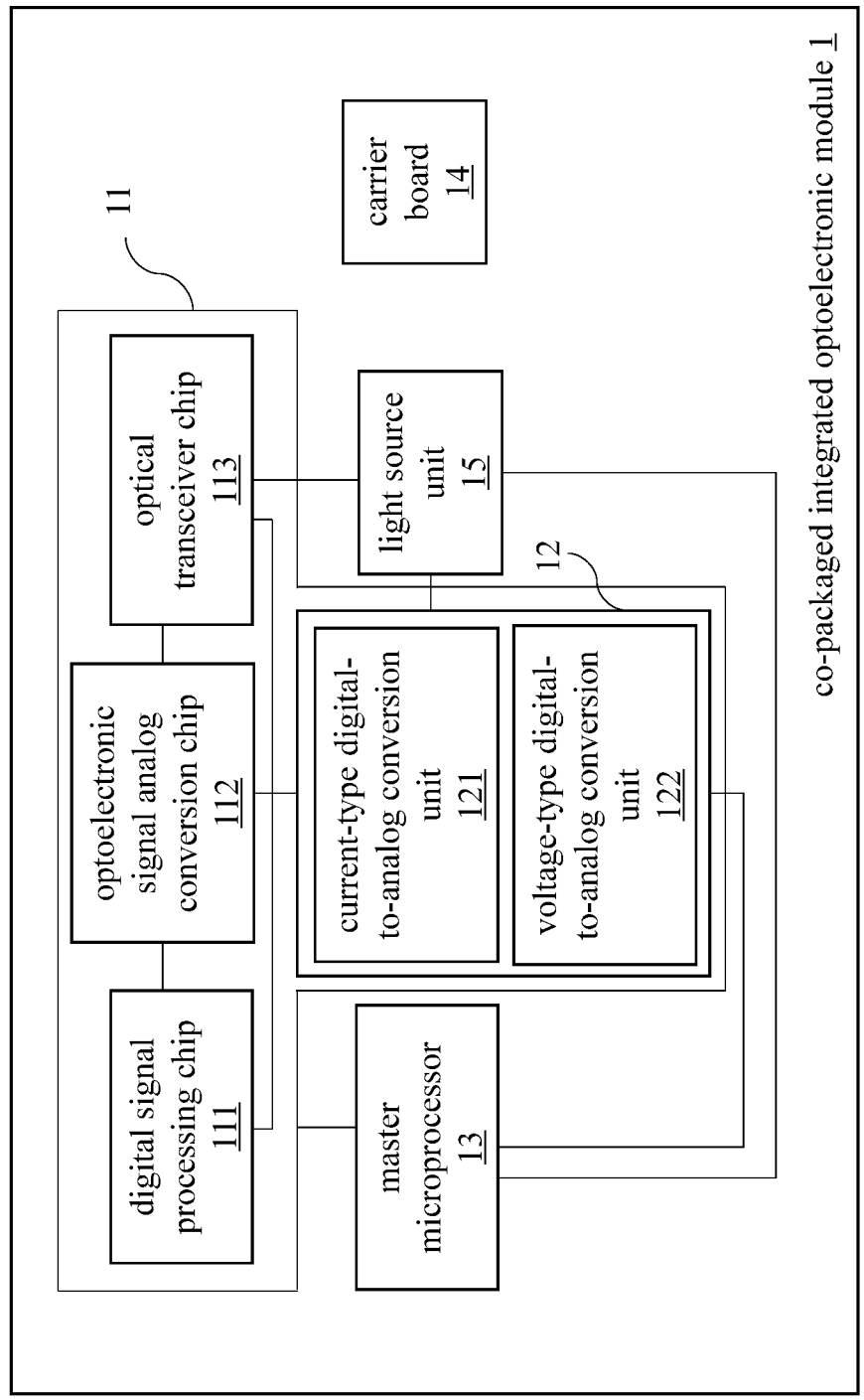
FIG. 9 is a block diagram of a co-packaged integrated optoelectronic module according to an eighth embodiment of the present disclosure.

In an embodiment, the slave microprocessor 12 can be integrated into the optoelectronic submodule 11 (as shown in FIG. 9, which is a block diagram of a co-packaged integrated optoelectronic module according to an eighth embodiment of the present disclosure). When the number of optoelectronic modules 11 is an even number, the number of slave microprocessors 12 is also an even number.

Figure 10:
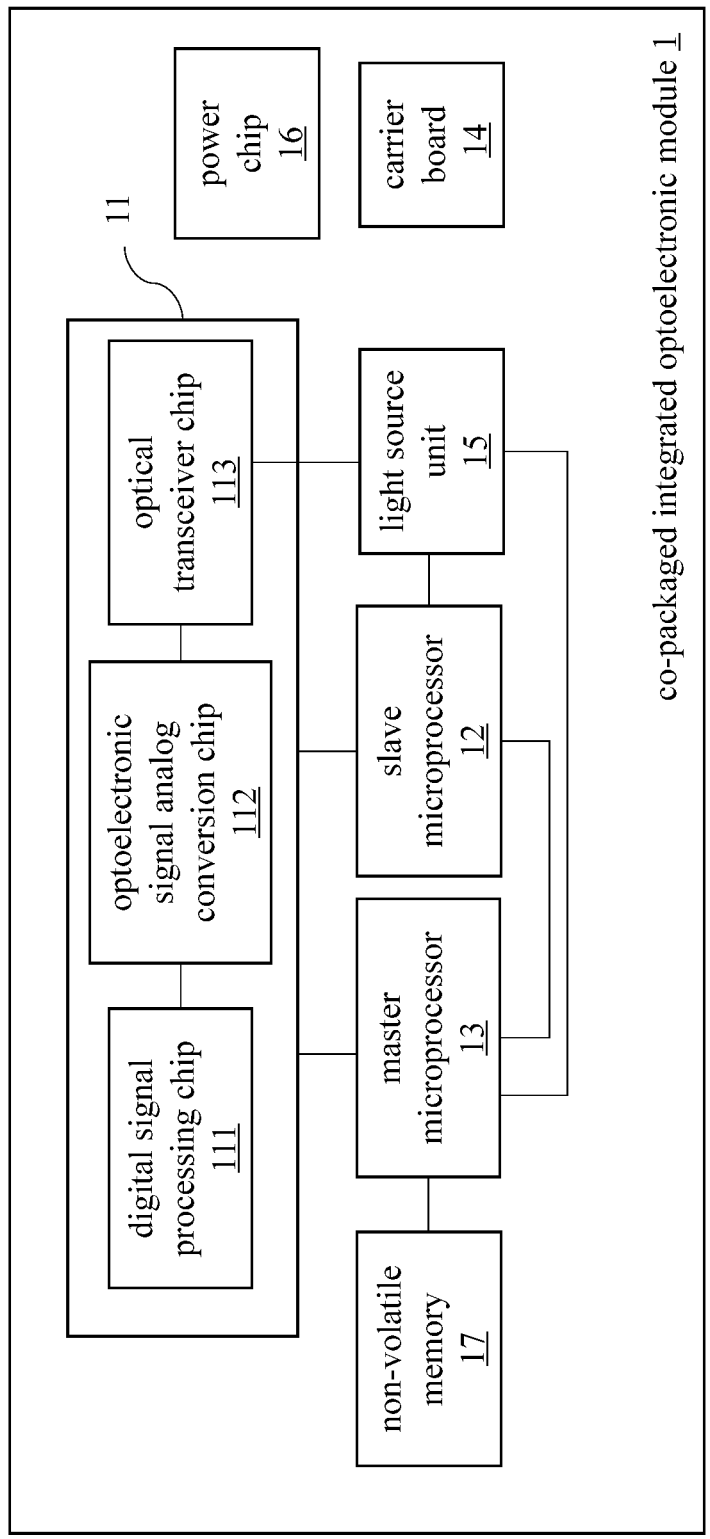
FIG. 10 is a block diagram of a co-packaged integrated optoelectronic module according to a ninth embodiment of the present disclosure.

In an embodiment, the co-packaged integrated optoelectronic module 1 may further comprise a power chip 16, which is configured to provide power to the optoelectronic submodule 11, the slave microprocessor 12 and the master microprocessor 13 (as shown in FIG. 10, which is a block diagram of a co-packaged integrated optoelectronic module according to a ninth embodiment of the present disclosure). The power chip 16 can provide different voltage levels required by the optoelectronic submodule 11, the slave microprocessor 12 and the master microprocessor 13. It should be noted that, in order to avoid the complexity of the drawing in FIG. 7, the connection lines between the power chip 16 and the optoelectronic submodule 11, the slave microprocessor 12 and the master microprocessor 13 can be omitted from drawing.

In an embodiment, referring to FIG. 10, the slave microprocessor 12 may be further configured to perform power management on the optoelectronic submodule 11 through the power chip 16 based on the digital monitoring data of the optoelectronic submodule 11. Specifically, since the slave microprocessor 12 can monitor the operation of the optoelectronic submodule 11, the slave microprocessor 12 can control and manage the step-up/step-down of the power of the optoelectronic submodule 11 through the power chip 16 according to the monitoring result of the optoelectronic submodule 11 (i.e., the digital monitoring data).

In an embodiment, referring to FIG. 10, the co-packaged integrated optoelectronic module 1 may further comprise a non-volatile memory 17 connected to the master microprocessor 13 and configured to store a initialization program required by the master microprocessor 13 to perform initialization of the co-packaged integrated optoelectronic module 1. The master microprocessor 13 can initialize the power chip 16, the digital signal processing chip 111, the optoelectronic signal analog conversion chip 112 and the optical transceiver chip 113 based on the initialization program stored in the nonvolatile memory 17. In addition, the non-volatile memory 17 can further store parameters or data required for the operation of the co-packaged integrated optoelectronic module 1. After the master microprocessor 13 initializes the co-packaged integrated optoelectronic module 1, the master microprocessor 13 can read the parameters or data stored in the non-volatile memory 17 to control the overall operation of the co-packaged integrated optoelectronic module 1.

Figure 11:
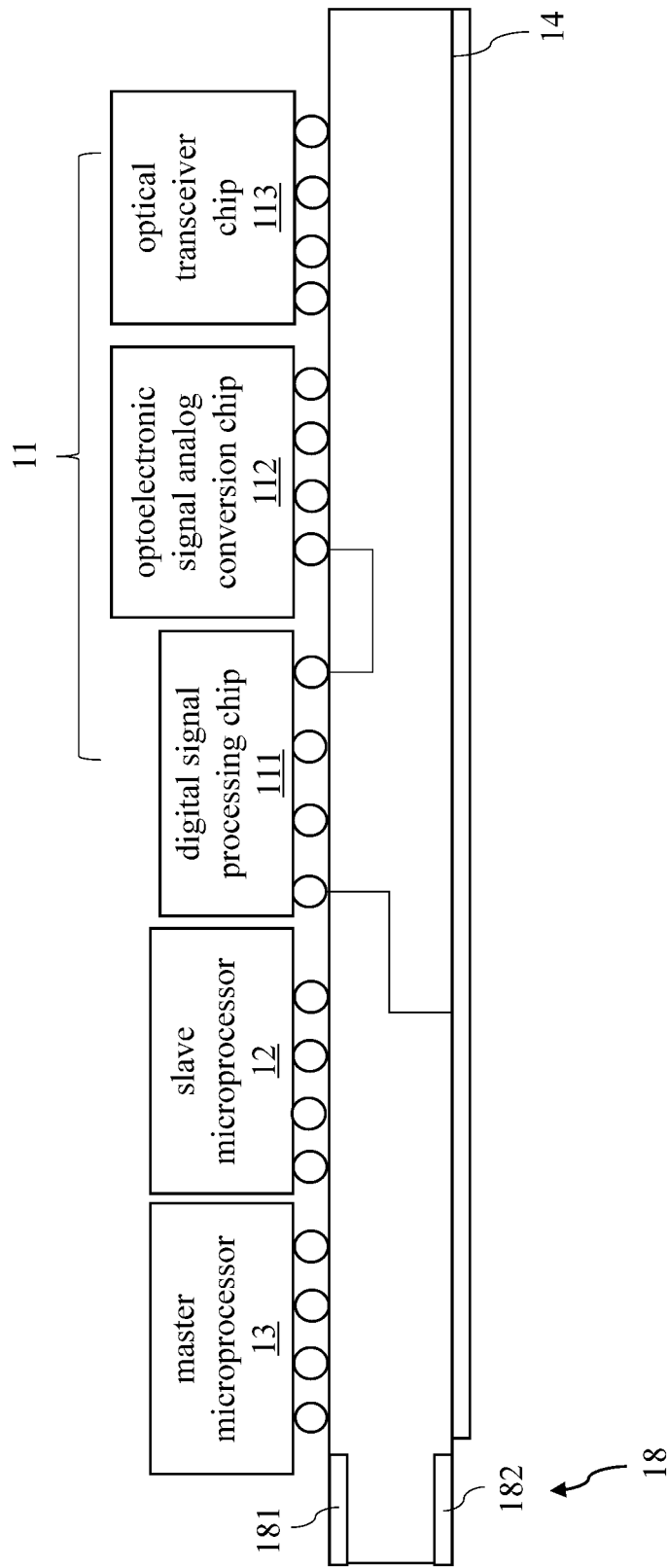
FIG. 11 is a schematic cross-sectional view of another embodiment of the optoelectronic submodule, the slave microprocessor and the master microprocessor of FIG. 1 disposed on a carrier board.

In an embodiment, please refer to FIGS. 2 and 11, wherein FIG. 11 is a schematic cross-sectional view of another embodiment of the optoelectronic submodule, the slave microprocessor and the master microprocessor of FIG. 1 disposed on a carrier board. The co-packaged integrated optoelectronic module 1 may further comprise a connection port 18 disposed on and electrically connected to the carrier board 14 and configured to electrically connect to an external circuit.

In an embodiment, the package of the co-packaged integrated optoelectronic module 1 may be a ball grid array (BGA) package or a land grid array (LGA) package, and the connection port 18 may be a BGA socket connector or LGA socket connector, as shown in FIG. 2.

In an embodiment, the connection port 18 may be a golden finger interface. Specifically, the golden finger interface may be, but is not limited to, a single-layer or multi-layer golden finger interface, and the multi-layer golden finger interface may comprise a top golden finger 181 and a bottom golden finger 182, as shown in FIG. 11.

Figure 12:
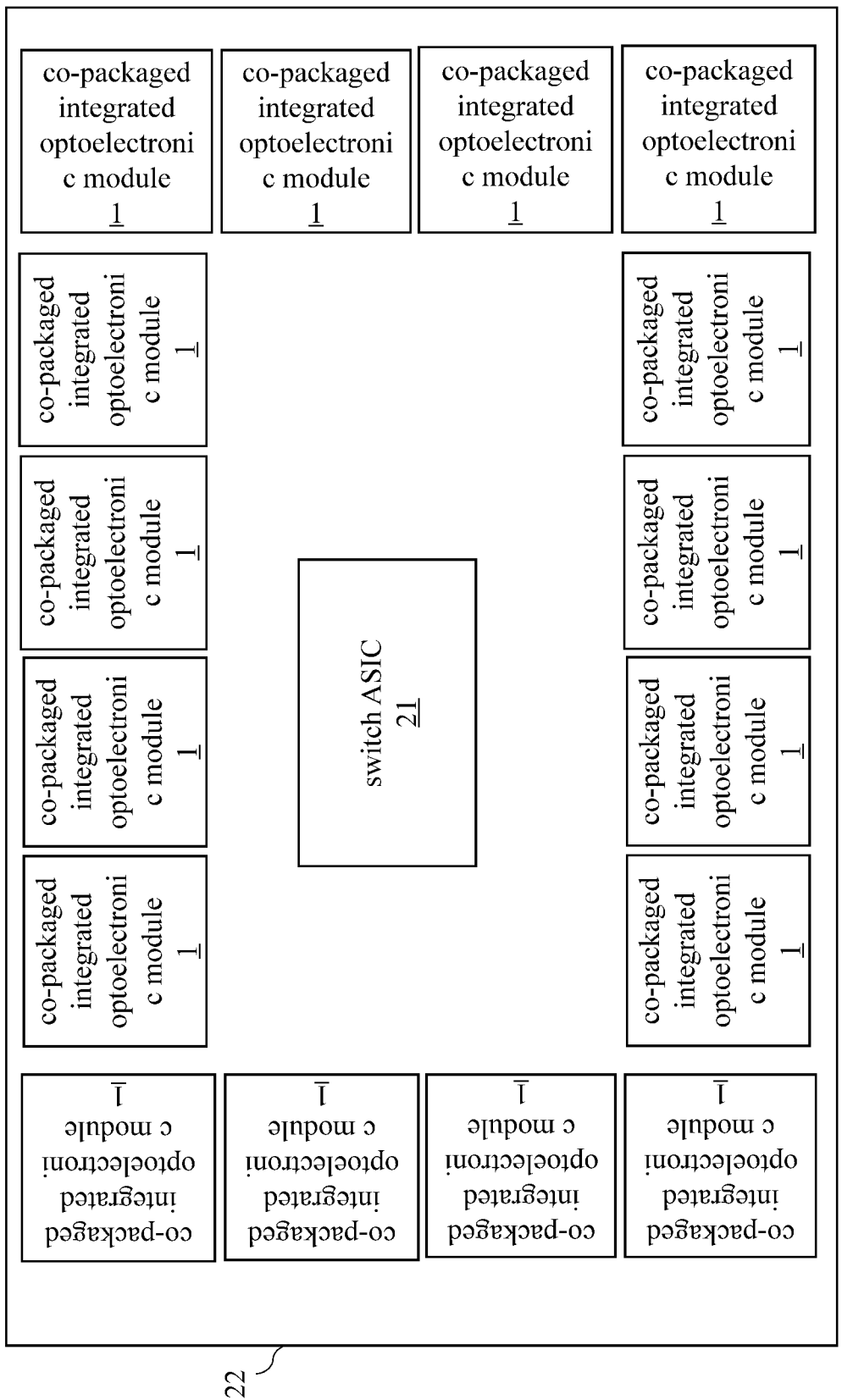
FIG. 12 is a schematic diagram of a co-packaged optoelectronic switch chip according to an embodiment of the present disclosure.

Please refer to FIG. 12, which is a schematic diagram of a co-packaged optoelectronic switch chip according to an embodiment of the present disclosure. As shown in FIG. 12, the co-packaged optoelectronic switch chip 2 comprises a switch ASIC 21, an even number of the co-packaged integrated optoelectronic modules 1 and a substrate 22. The even number of the co-packaged integrated optoelectronic modules 1 and the switch ASIC 21 are disposed in and electrically connected to the substrate 22, and the even number of the co-packaged integrated optoelectronic modules 1 are respectively electrically connected to the switch ASIC 21 and surround the switch ASIC 21. The substrate 22 may be but not limited to a printed circuit board, and the number of the co-packaged integrated optoelectronic modules 1 may be but not limited to sixteen. It should be noted that, in order to avoid the complexity of the drawing in FIG. 12, the electrical connection lines among the even number of the co-packaged integrated optoelectronic modules 1, the switch ASIC 21, and the substrate 22 can be omitted from drawing.

In an embodiment, the co-packaged integrated optoelectronic module 1 can be electrically connected to the substrate 22 through the connection port 18 to electrically connect the switch ASIC 21. Specifically, the substrate 22 has a connection interface (e.g., a slot) that is connected to the connection port 18 to electrically connect the co-packaged integrated optoelectronic module 1.

In summary, in the embodiments of the present disclosure, the co-packaged integrated optoelectronic module integrates and encapsulates the optoelectronic submodule, the slave microprocessor, and the master microprocessor, thereby achieving miniaturization of the co-packaged integrated optoelectronic module. When the miniaturized co-packaged integrated optoelectronic module is applied to the co-packaged optoelectronic switch chip, the co-packaged optoelectronic switch chip can accommodate more co-packaged integrated optoelectronic modules in a limited space and the data transmission of the co-packaged optoelectronic switch chip can be improved to meet the development needs of the market. In addition, the overall operation of the co-packaged integrated optoelectronic module can be effectively monitored and controlled by the settings of the slave microprocessor and the master microprocessor.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A co-packaged integrated optoelectronic module, comprising:
    an optoelectronic submodule, comprising:
        a digital signal processing chip configured to convert an electrical analog signal, which is received, into an electrical digital signal, and process the electrical digital signal to output a high-speed digital signal;
        an optoelectronic signal analog conversion chip connected to the digital signal processing chip and configured to convert an optical analog signal into the electrical analog signal to the digital signal processing chip; and
        an optical transceiver chip connected to the optoelectronic signal analog conversion chip and configured to receive and transmit the optical analog signal to the optoelectronic signal analog conversion chip, and transmit another optical analog signal;
    a slave microprocessor connected to the optoelectronic submodule and configured to monitor operation of the optoelectronic submodule;
    a master microprocessor connected to the optoelectronic submodule and configured to process a low-speed digital signal transmitted from the co-packaged integrated optoelectronic module to the outside, monitor operation of the co-packaged integrated optoelectronic module, and perform initialization of the co-packaged integrated optoelectronic module;
    a carrier board, wherein the optoelectronic submodule, the slave microprocessor and the master microprocessor are disposed on and electrically connected to the carrier board; and
    a power chip configured to provide power to the optoelectronic submodule, the slave microprocessor and the master microprocessor;
    wherein the slave microprocessor is further configured to perform power management on the optoelectronic submodule through the power chip based on digital monitoring data of the optoelectronic submodule.

2. The co-packaged integrated optoelectronic module according to claim 1, further comprising:
    a light source unit connected to the optical transceiver chip and the slave microprocessor and configured to output the another optical analog signal to the optical transceiver chip for transmission based on a control signal from the slave microprocessor.

3. The co-packaged integrated optoelectronic module according to claim 2, wherein the light source unit comprises one or an even number of lasers, and the light source unit is configured to output the another optical analog signal having a single wavelength through the one or the even number of lasers.

4. The co-packaged integrated optoelectronic module according to claim 2, wherein the light source unit comprises an even number of lasers, and the light source unit is configured to output the another optical analog signal having different wavelengths through the even number of lasers.

5. The co-packaged integrated optoelectronic module according to claim 2, wherein the slave microprocessor is further configured to output a control current matching the control signal to the light source unit in a current-type digital-to-analog conversion manner, or output a control voltage matching the control signal to the light source unit in a voltage-type digital-to-analog conversion manner.

6. The co-packaged integrated optoelectronic module according to claim 2, wherein the slave microprocessor is further configured to perform closed loop control of the optoelectronic submodule and the light source unit according to digital monitoring data of the optoelectronic submodule and the light source unit.

7. The co-packaged integrated optoelectronic module according to claim 2, wherein the light source unit is integrated into the optoelectronic submodule.

8. The co-packaged integrated optoelectronic module according to claim 1, wherein the slave microprocessor is integrated into the optoelectronic submodule.

9. The co-packaged integrated optoelectronic module according to claim 1, wherein the number of the optoelectronic submodule is one or an even number.

10. The co-packaged integrated optoelectronic module according to claim 1, further comprising a non-volatile memory connected to the master microprocessor and configured to store an initialization program required by the master microprocessor to perform initialization of the co-packaged integrated optoelectronic module.

11. The co-packaged integrated optoelectronic module according to claim 1, further comprising a connection port disposed on and electrically connected to the carrier board and configured to electrically connect to an external circuit.

12. The co-packaged integrated optoelectronic module according to claim 11, wherein the connection port is a ball grid array (BGA) socket connector, a land grid array (LGA) socket connector or a golden finger interface.

13. A co-packaged optoelectronic switch chip, comprising:
a switch application specific integrated circuit (ASIC);
an even number of the co-packaged integrated optoelectronic modules according to claim 1, which are respectively electrically connected to the switch ASIC; and
a substrate, wherein the even number of the co-packaged integrated optoelectronic modules and the switch ASIC are disposed on and electrically connected to the substrate, and the even number of the co-packaged integrated optoelectronic modules surround the switch ASIC.

14. The co-packaged optoelectronic switch chip according to claim 13, wherein the co-packaged integrated optoelectronic module further comprises a connection port, and the co-packaged integrated optoelectronic module is electrically connected to the substrate through the connection port to electrically connect to the switch ASIC.

15. The co-packaged optoelectronic switch chip according to claim 14, wherein the connection port is a BGA socket connector, a LGA socket connector or a golden finger interface.

16. The co-packaged optoelectronic switch chip according to claim 13, wherein the co-packaged integrated optoelectronic module further comprises a light source unit connected to the optical transceiver chip and the slave microprocessor and configured to output the another optical analog signal to the optical transceiver chip for transmission based on a control signal from the slave microprocessor.

17. The co-packaged optoelectronic switch chip according to claim 13, wherein the co-packaged integrated optoelectronic module further comprises a power chip configured to provide power to the optoelectronic submodule, the slave microprocessor and the master microprocessor.

18. The co-packaged optoelectronic switch chip according to claim 13, wherein the co-packaged integrated optoelectronic module further comprises a non-volatile memory connected to the master microprocessor and configured to store a initialization program required by the master microprocessor to perform initialization of the co-packaged integrated optoelectronic module.

* * * * *